(12) United States Patent　　　　　(10) Patent No.:　US 12,571,238 B2
Franek　　　　　　　　　　　　　　　(45) Date of Patent:　　Mar. 10, 2026

(54) CONTROL ARRANGEMENT FOR A MOTOR VEHICLE DOOR

(71) Applicant: Brose Fahrzeugteile SE & Co. Kommanditgesellschaft, Bamberg, Bamberg (DE)

(72) Inventor: Stefan Franek, Buchenrod (DE)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 198 days.

(21) Appl. No.: 16/982,109

(22) PCT Filed: Mar. 18, 2019

(86) PCT No.: PCT/EP2019/056649
§ 371 (c)(1),
(2) Date: Sep. 18, 2020

(87) PCT Pub. No.: WO2019/179910
PCT Pub. Date: Sep. 26, 2019

(65) Prior Publication Data
US 2021/0363789 A1　　Nov. 25, 2021

(30) Foreign Application Priority Data
Mar. 19, 2018　(DE) ..................... 10 2018 106 410.1

(51) Int. Cl.
E05B 81/16　　　(2014.01)
E05B 81/82　　　(2014.01)
(Continued)

(52) U.S. Cl.
CPC .............. E05B 81/16 (2013.01); E05B 81/82 (2013.01); E05B 81/88 (2013.01); H02J 50/005 (2020.01)

(58) Field of Classification Search
CPC .......... E05B 81/16; E05B 81/80; E05B 81/82; E05B 81/86; E05B 81/88; H02J 50/005;
(Continued)

(56) References Cited

U.S. PATENT DOCUMENTS

| 9,118,193 B2 | 8/2015 | Yeh | |
| 2013/0271070 A1* | 10/2013 | Hirano | ................... H02J 7/0044 |
| | | | 206/703 |

(Continued)

FOREIGN PATENT DOCUMENTS

| DE | 4228234 A1 | 3/1994 |
| DE | 10206968 A1 | 8/2003 |

(Continued)

OTHER PUBLICATIONS

Machine translation of written description for DE 102016109326 A1 (Year: 2017).*

*Primary Examiner* — Christine M Mills
*Assistant Examiner* — Christopher F Callahan
(74) *Attorney, Agent, or Firm* — Dickinson Wright PLLC

(57)　　　　　　ABSTRACT

A control arrangement for a motor vehicle door supplied with electrical power from a motor vehicle on-board network and including a lock with an electric opening drive for the motorized opening of the motor vehicle lock. The control arrangement has a door control unit for controlling the opening drive and changes from a normal operating mode to an emergency operating mode in response to a predetermined emergency situation. The control arrangement has a power transmission unit, configured to, responsive to the door control unit changing from the normal operating mode to the emergency operating mode, wirelessly receive electric power from a first mobile device and provide the electric power to the door control unit so that the opening drive opens the lock.

19 Claims, 2 Drawing Sheets

(51) Int. Cl.
  *E05B 81/88*　　　(2014.01)
  *H02J 50/00*　　　(2016.01)

(58) Field of Classification Search
  CPC ........ Y10T 292/1047; Y10T 292/1082; G07C
  　　　　　　　　　　　　　　　　　　　　　　　2009/00984
  See application file for complete search history.

(56) References Cited

U.S. PATENT DOCUMENTS

| | | | | |
|---|---|---|---|---|
| 2014/0316612 | A1 * | 10/2014 | Banter | B60R 25/01 |
| | | | | 701/2 |
| 2016/0340940 | A1 * | 11/2016 | Krishnan | B60R 25/01 |
| 2017/0089104 | A1 * | 3/2017 | Kowalewski | E05B 81/82 |
| 2018/0051493 | A1 * | 2/2018 | Krishnan | G07C 9/00182 |

FOREIGN PATENT DOCUMENTS

| | | | | | |
|---|---|---|---|---|---|
| DE | 102013002747 | A1 | | 8/2014 | |
| DE | 112013000504 | T5 | | 10/2014 | |
| DE | 102014105872 | A1 | | 10/2015 | |
| DE | 102016106371 | A1 | | 10/2017 | |
| DE | 102016109326 | A1 | * | 11/2017 | E05B 81/14 |
| EP | 2425516 | A2 | | 3/2012 | |
| FR | 2917112 | A1 | | 12/2008 | |
| JP | 2009513844 | A | * | 4/2009 | E05B 47/00 |
| JP | 4558723 | B2 | * | 10/2010 | E05B 81/86 |
| WO | 2013103943 | A1 | | 7/2013 | |
| WO | WO-2014130046 | A1 | * | 8/2014 | B60L 11/005 |
| WO | 2019030339 | A1 | | 2/2019 | |

* cited by examiner

CONTROL ARRANGEMENT FOR A MOTOR VEHICLE DOOR

CROSS-REFERENCE TO RELATED APPLICATIONS

This application is the U.S. National Phase of PCT Application No. PCT/EP2019/056649 filed on Mar. 18, 2019, which claims priority to German Patent Application No. DE 10 2018 106 410.1, filed on Mar. 19, 2018, the disclosures of which are hereby incorporated in their entirety by reference herein.

TECHNICAL FIELD

The present disclosure relates to a control arrangement for a motor vehicle door.

BACKGROUND

The motor vehicle doors of today's motor vehicles are increasingly equipped with so-called "electric locks", which can be opened exclusively electrically by means of an electric opening drive. Whereas this is associated with a considerable degree of comfort as a result of the elimination of actuation forces, additional measures must be taken to maintain operating safety in the event of an emergency, such as a failure of the on-board network voltage.

SUMMARY

The present disclosure may address one or problems such as opening the motor vehicle door in an emergency in an operationally simple way is guaranteed.

According to one or more embodiments, a control arrangement for use in a motor vehicle door including a lock and an opening drive configured to open the lock. The control arrangement, when in an assembled state, may receive electrical power from a motor vehicle on-board network. The arrangement may include a door control unit configured to control the opening drive and change from a normal operating mode to an emergency operating mode in response to detecting an emergency and a power transmission unit, configured to, responsive to the door control unit changing from the normal operating mode to the emergency operating mode, wirelessly receive electric power from a first mobile device and provide the electric power to the door control unit so that the opening drive opens the lock.

The reception of electrical power from the mobile device, which is referred to here as the "mobile device of the first type", can be received wirelessly. This eliminates the need for any power plugs to transmit electrical power. Furthermore, there is the possibility in principle of using charging stations for mobile devices already present in the vehicle interior, in particular for mobile telephones, for the reception of electrical power.

In detail it is proposed that the power transmission unit is set up for the wireless reception of electrical power from the mobile device of the first type and that the door control unit is set up to receive electrical power from the mobile device of the first type via the power transmission unit in the emergency operating mode and to use the received electrical power to control the electric drive for lifting the locking pawl.

The door control unit can be equipped with a microcontroller, which ensures a predetermined process when controlling the opening drive. In principle, however, the door control unit can also be a simple cable network, through which the reception and transmission of electrical power are possible depending on the operating mode.

A dual use of the power transmission unit may be provided. It is provided here that the power transmission unit is set up not only for wireless reception of electrical power, but also for wireless delivery of electrical power to the mobile device of the first type or to a mobile device of a second type. The power transmission unit may, for example, be a charging station, which now has the additional function of the wireless reception of electrical power in the emergency operating mode.

The mobile device of the first type is a mobile device for the wireless delivery of electrical power, for example a power bank. As an example, this can also be a mobile telephone, insofar as this is set up to deliver electrical power wirelessly.

The mobile device of the second type, on the other hand, is set up for wireless reception of electrical power. This may be a suitably equipped mobile telephone.

For example, it is conceivable with the proposed solution that in the normal operating mode the power transmission unit is used for charging the mobile device of the second type, for example a mobile telephone, while in the emergency operating mode the power transmission unit is used for the reception of electrical power from the mobile device of the first type, for example a power bank. The advantageousness of the dual use of the power transmission unit is particularly evident here.

In order to avoid undesirable discharging of the respective mobile device via the power transmission unit and a user confirmation may be necessary before discharging.

As an example, a necessary condition for the motorized opening of the motor vehicle lock may include that an electric door actuation element has been actuated by the user. This ensures that the operator is not surprised by the motorized opening of the motor vehicle lock in the emergency operating mode.

In one or more embodiments, the power transmission unit has a further function, namely the establishment of a wireless communication path to the mobile device. This makes it possible to cause an authentication dialog, the output of which determines whether or not electrical power may be received by the respective mobile device or not.

As an example, the received electrical power may be passed directly, i.e. without buffering, to the door control unit and/or the opening drive. Alternatively, it is also conceivable that an energy buffer is provided for buffering the received power. While the first solution is cost-effective, the second solution can achieve even greater operational reliability, since the buffering does not play a role in the possible power fluctuations of the electrical power received from the mobile device.

The predetermined emergency may include detection of which triggers the transfer of the control arrangement into the emergency operating mode. As an example, the detection of the emergency is based on the fact that the control arrangement receives a crash signal from a crash sensor. Alternatively, the emergency can be defined by the fact that the on-board network voltage falls below a predetermined minimum threshold.

In the event of a crash, in the emergency operating mode the control arrangement may make an invitation to the operator via an input/output unit to insert a mobile device into the charging station. This invitation can also be made acoustically, for example by means of a voice output. With this measure the likelihood is increased that the energy present within the motor vehicle in the form of mobile devices can be used in the emergency operating mode.

According to one or more embodiments, a motor vehicle door with a motor vehicle lock and a proposed control arrangement. Reference may be made to all the statements relating to the proposed control arrangement.

In one or more embodiments, the inner trim of the motor vehicle door provides a charging station for the mobile device of the first type or for the mobile device of the second type. In this respect, too, reference may be made to the statements regarding the first-mentioned teaching.

According another embodiment, a motor vehicle with at least one proposed motor vehicle door is claimed as such. Reference may be made to all statements regarding the motor vehicle door and regarding the proposed control arrangement.

According to another embodiment, which also has independent significance, a method for the control of a motor vehicle door by means of a proposed control arrangement is provided.

With the proposed method, in the assembled state the control arrangement is supplied with electrical power from a motor vehicle on-board network. In the emergency operating mode, electrical power is received from a mobile device of a first type via the power transmission unit.

In one or more embodiments, the emergency operating mode electrical power may be received wirelessly from the mobile device of the first type via the power transmission unit and that the opening drive is controlled by means of the door control unit for lifting the locking pawl using the received electrical power. The proposed method thus concerns the manner of operation of the proposed control arrangement, so that reference may also be made in this respect to the statements regarding the proposed control unit.

BRIEF DESCRIPTION OF THE DRAWINGS

In the following, the invention is explained in more detail on the basis of a drawing illustrating an exemplary embodiment. In the drawing

DETAILED DESCRIPTION

Figure 1:
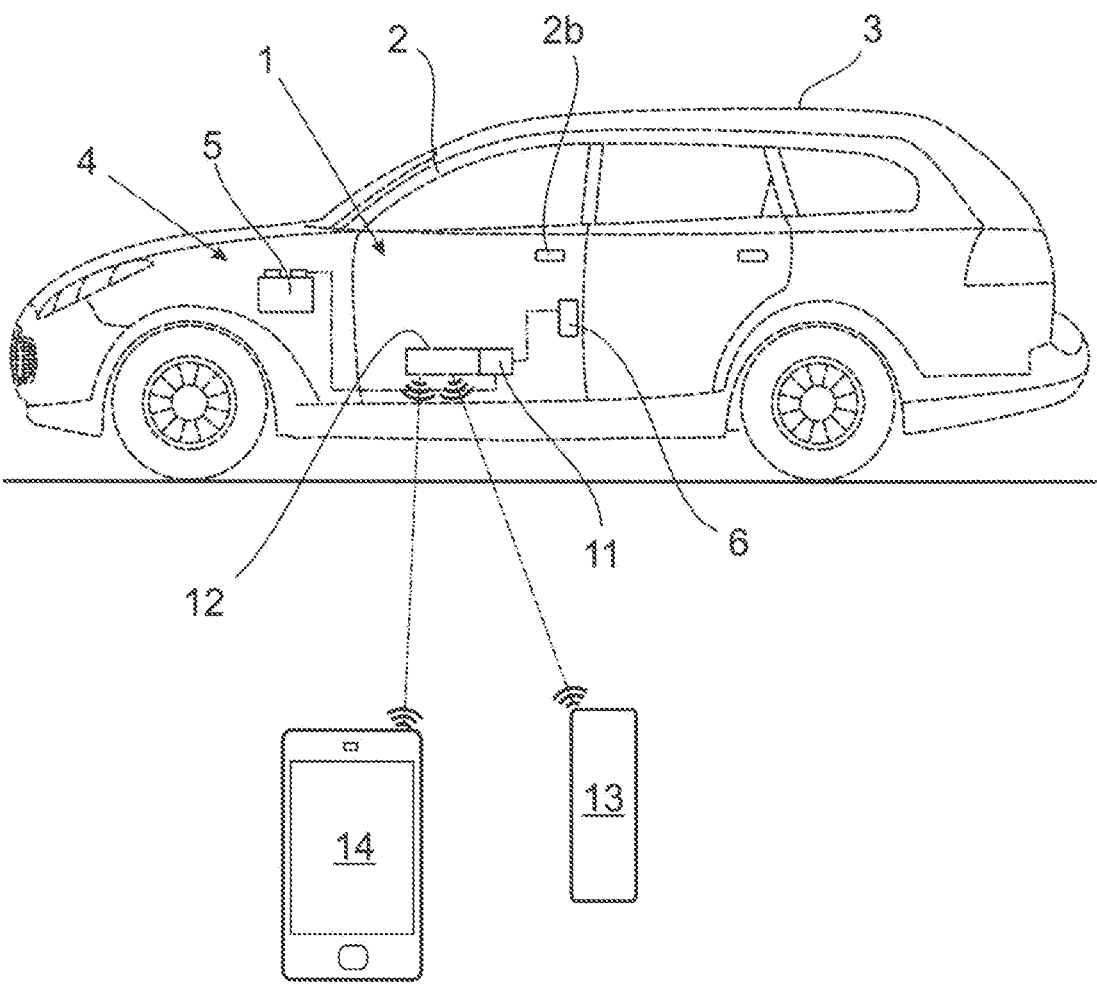
FIG. 1 shows a proposed motor vehicle with a proposed control arrangement in an entirely schematic illustration and FIG. 2 shows the motor vehicle door of the motor vehicle in accordance with FIG. 1, also in an entirely schematic illustration.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a known control arrangement (DE 10 2014 105 872 A1), each vehicle door is assigned a motor vehicle lock with a lock latch, a locking pawl assigned to the lock latch and an electric opening drive for motorized lifting of the locking pawl. The motor vehicle lock is equipped with an additional energy store, which takes over the electrical supply of the opening drive in the event of failure of the on-board network voltage. The disadvantage here is the fact that the constant recharging of the energy store is complex, and that high reliability can only be guaranteed by regular replacement of the energy store.

The known control arrangement (U.S. Pat. No. 9,118,193 B2), can be transferred in the event of failure of the on-board network voltage from a normal operating mode to an emergency operating mode, in which the supply of electrical power is provided from a mobile telephone. For this purpose, the control arrangement is equipped with a power transmission unit with a power plug to which the mobile telephone can be connected for the transmission of electrical power. This solution is technically complex and requires a high implementation cost.

A charging station for a mobile telephone, which is provided by a door module of a motor vehicle door, is known from DE 10 2013 002 747 A1. This ensures that any mobile telephone which is present can always be charged wirelessly, so that in the event of a failure of the on-board network voltage, it is possible to call for help by telephone. However, an improvement of the vehicle's technical function in the event of a failure of the on-board network voltage is not associated with this.

The proposed control arrangement 1 is assigned to a motor vehicle door 2 of a motor vehicle 3. The motor vehicle door 2 may be any motor vehicle door of the motor vehicle 3. As an example, the motor vehicle door 2 is a side door of the motor vehicle 3, in particular a front side door. All the relevant versions shall accordingly apply to all other motor vehicle doors 2, in particular to the rear motor vehicle doors or to a tailgate.

The control arrangement 1 is supplied with electrical power in the assembled state from a motor vehicle on-board network 4, which is supplied by a vehicle battery 5.

The motor vehicle door 2 has a motor vehicle lock 6 with an electric opening drive 7 for the motorized opening of the motor vehicle lock 6. As an example, the motor vehicle lock 6 is equipped with a locking mechanism 8 of a lock latch 9 and a locking pawl 10. For the motorized opening of the motor vehicle lock 6, the opening drive 7 is technically coupled or couplable to the locking pawl 10, so that the locking pawl 10 can be lifted in a motorized manner by means of the opening drive 7.

The control arrangement 1 has a door control unit 11 for the control of the opening drive 7. The door control unit 11 may be equipped with a logic system, which coordinates the motorized opening of the motor vehicle lock 6. In principle, however, the door control unit 11 may also only provide the cable network which is required for the energization of the opening drive 7. With a further alternative, the door control unit 11 can be provided by the central door control system, which accordingly controls the opening drives of all other motor vehicle doors 2.

When used in accordance with normal operation, the control arrangement 1 is in a normal operating mode, in which the motorized opening of the motor vehicle lock 6 is possible under operator control by means of electric door actuation elements 2a, 2b.

However, as soon as the control arrangement 1 detects a predetermined emergency, it switches to an emergency operating mode. The predetermined emergency, for example, corresponds to at least partial failure of the on-board network voltage. The detection of the predetermined emergency may be carried out by means of the door control unit 11.

Figure 2:
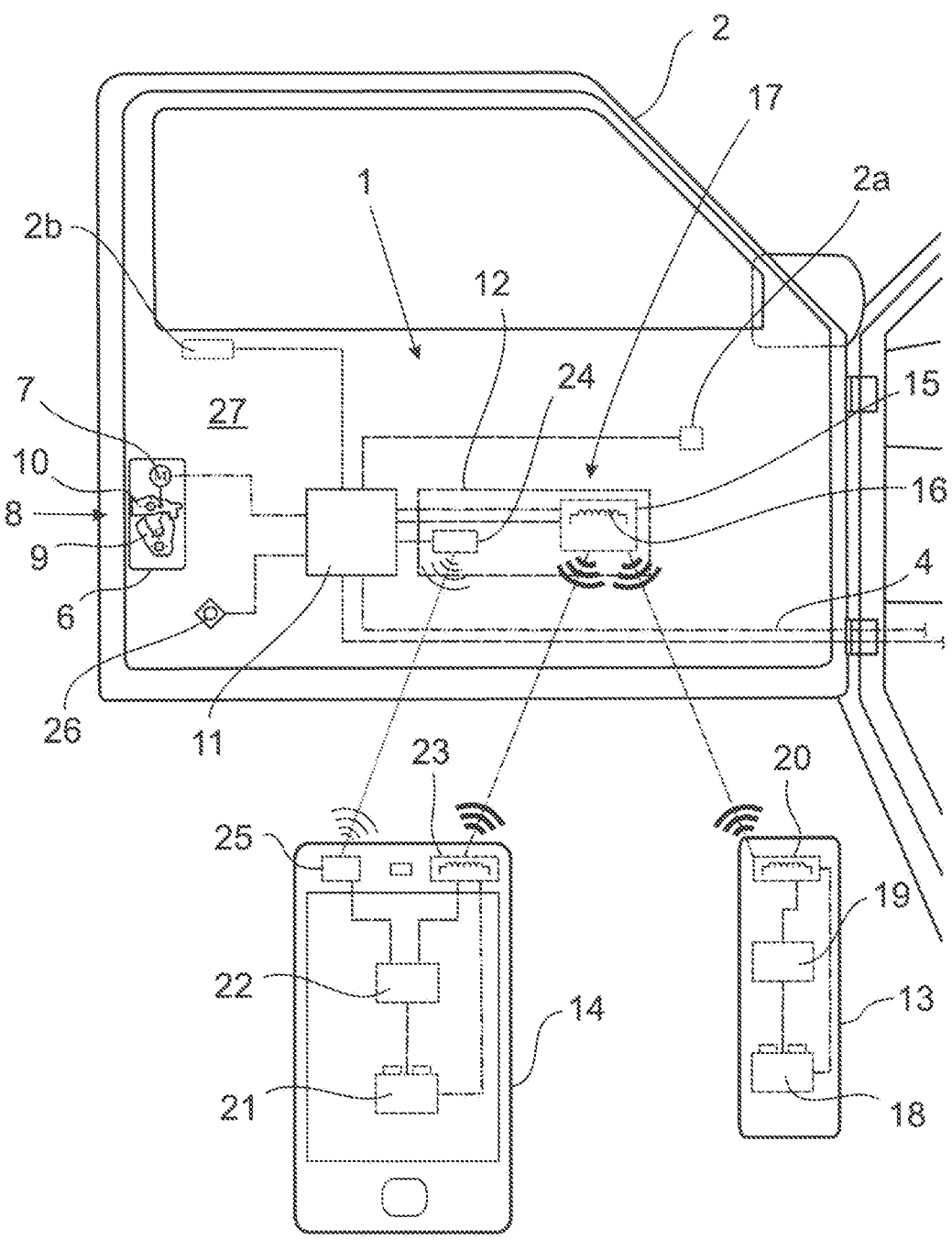

FIG. 2 shows that the control arrangement 1 also has a power transmission unit 12, wherein in the emergency operating mode the reception of electrical power from a mobile device of the first type 13 via the power transmission unit 12 is provided.

It is now essential that the power transmission unit 12 is set up for wireless reception of electrical power from the mobile device of the first type 13. The wireless transmission of electrical power is carried out in the present case via an inductive coupling or a capacitive coupling. For this purpose, different standards have already become known, which may be applied in the proposed solution. Examples of this are the Qi standard, the PMA standard, the A4WP standard, and the like.

It is also essential that the door control unit 11 is set up to receive electrical power from the mobile device of the first type 13 via the power transmission unit 12 in the emergency operating mode and to control the opening drive 7 for opening the motor vehicle lock 6 using the received electrical power. The mobile device of the first type 13 may be a mobile energy store, such as a power bank, as will be explained.

The motor vehicle lock 6 may be an electric lock, which can be opened exclusively electrically, i.e. by means of the opening drive 7. In other words, the locking pawl 10 can be lifted exclusively by means of the opening drive 7, and not for example by means of a mechanical force chain to an inner door handle or an outer door handle. In the case of such an electric lock, the proposed solution is of particular significance since the functionality of the opening drive 7 must be ensured even in the event of a failure of the on-board network voltage.

It one or more embodiments, the power transmission unit 12 is set up not only for the reception of electrical power, but also for the supply of electrical power. This means that the power transmission unit 12 is set up to charge the mobile device of the first type 13 or a mobile device of a second type 14 for the wireless delivery of electrical power to the respective mobile device 13, 14 in the normal mode. For this purpose, the power transmission unit 12 has a wireless transmitting/receiving unit 15, which is used for both the reception of electrical power and the delivery of electrical power. In the event that the power transmission unit 12 operates with an inductive coupling, the transmitting/receiving unit 15 has a coil arrangement 16, which is accordingly used in a dual manner, namely for both reception and transmission of electrical power. This abstract representation naturally encompasses that the electrical power is temporarily converted to magnetic power for its transmission.

In the above dual use of the power transmission unit 12 the power transmission unit 12 may form a charging station 17 for the mobile device of the first type 13 and/or for the mobile device of the second type 14, wherein the respective mobile device 13, 14 can be inserted into the charging station 17 in a form-fitting manner. This ensures that the mobile device in question 13, 14 is in close proximity to the power transmission unit 12. This takes into account the fact that the power transmission unit 12 may be set up for close proximity transmission of electrical power.

The mobile device of the first type 13 may be configured at least for wireless delivery of electrical power. Accordingly, the mobile device of the first type 13 may be a power bank as mentioned above or the like. In principle, however, it may also be provided that the mobile device of the first type 13 is additionally set up for wireless reception of electrical power. In this respect also, the mobile device of the first type 13 may then be a power bank. Finally, it is also conceivable that the mobile device of the first type 13 is a mobile telephone, which is set up both for the wireless transmission of electrical power and for the reception of electrical power.

The mobile device of the second type 14 may be configured at least for wireless reception of electrical power. The mobile device of the second type 14 may be a suitably equipped mobile telephone.

FIG. 2 shows a mobile device of the first type 13, which is designed as a power bank. The power bank has an energy store 18 in the form of a battery, a charging controller 19 and a charging adapter 20, which is set up for the bi-directional transmission of electrical power. The mobile device of the second type 14 is designed here as a mobile telephone, which has an energy store 21 in the form of a battery, a charging controller 22 and a charging adapter 23, which is also set up for the bi-directional transmission of electrical power. At the very least, however, it is envisaged that the charging adapter 20 of the mobile device of the first type 13 is set up for the wireless delivery of electrical power and that the charging adapter 23 of the mobile device of the second type 14 is set up for wireless reception of electrical power.

In order to prevent undesired discharging of a mobile device 13, 14 which is located in the vicinity of the power supply unit 12, may be provided that the control arrangement 1 requests a confirmation by the operator via an input/output unit that is not shown and/or via the device in question 13, 14 in the emergency operating mode, and only enables the reception of electrical power via the power transmission unit 12 after receipt of the confirmation. This confirmation function of the control arrangement 1 may be implemented in the door control unit 11.

In the representation according to FIG. 2 it is further apparent that the control arrangement 1 has an electrical door contact element 2a, 2b further referred to above, wherein in the emergency operating mode control of the opening drive 7 can be triggered by actuation of the relevant electric door actuation element 2a, 2b. This means that motorized opening of the motor vehicle lock 6 when changing from the normal operating mode to the emergency operating mode does not take place suddenly, but the opening of the motor vehicle lock 6 is triggered only by actuating an electric door actuations element 2a, 2b as usual. Depending on the equipment of the motor vehicle door 2, this may be a door contact element 2a actuated from inside the motor vehicle 3 and/or a door actuation element 2b actuated from outside the motor vehicle 3.

As an example, the power transmission unit 12 has a further function, namely the function of setting up a wireless communication path. The power transmission unit 12 accordingly has a communication unit 24, with which a communication path to the respective mobile device 14 can be established. Preferably, it is the mobile device of the second type 14, which has a corresponding communication unit 25. In the illustrated and in this case preferred embodiment, the communication unit 24 of the power transmission unit 12 is designed separately from the transmitting/receiving unit 15. In a particularly preferred design, however, it is provided that the communication unit 24 is provided by the transmitting/receiving unit 15 itself. In this case, in the particularly preferred embodiment the transmission of the electrical power and the establishment of the communication path are carried out by means of the same transmission hardware. This leads to a particularly simple design in terms of hardware.

In the event that the establishment of a communication path referred to above between the mobile unit 13, 14 and the power transmission unit 12 is provided, a further possibility arises of avoiding an undesired discharge of the mobile device 13, 14 in question. In this case, the reception of electrical power via the power transmission unit 12 may be only carried out after establishment of the communication path and in particular only after successful execution of an authentication query via the communication path. This means that the reception of the electrical power from the power transmission unit 12 is enabled only after successful execution of the authentication query over the communication path.

FIG. 2 shows that the power transmission unit 12 passes the received electrical power on to the door control unit 11 without buffering in an energy buffer. Alternatively or additionally, it may be provided that the received electrical power is passed on to the opening drive 7 without buffering in an energy buffer. The simple implementation is advantageous, since an energy buffer can be dispensed with. Furthermore, there is no energy loss, which is always connected with the charging and discharging of an energy buffer.

Alternatively, on the other hand it may be provided that the power transmission unit 12 passes the received electrical power on to an energy buffer, which is used for the electrical supply of the door control unit 11 and/or the opening drive 7. This is more expensive in terms of hardware. However, this results in the possibility to provide the electrical control of the door control system 11 and/or the opening drive 7 independently of any fluctuations in the received electrical power.

For the definition of the predetermined emergency, on the basis of which the control arrangement 1 changes from the normal operating mode to the emergency operating mode, various advantageous variants are conceivable. As an example, the predetermined emergency is defined by the fact that the control arrangement 1 receives a crash signal from a crash sensor 26. FIG. 2 shows such a crash sensor 26, which is used in particular for detection of a side impact.

Alternatively or additionally, a predetermined emergency is defined by the fact that the on-board network voltage falls below a predetermined minimum threshold. Other types of predetermined emergencies are conceivable.

In order to ensure, in particular in the event of a crash, that all energy sources present in the interior of the vehicle in the form of mobile devices 13, 14 are available for the motorized opening of the motor vehicle lock 6, in the emergency operating mode the control arrangement 1 preferably gives a request to the operator via an input/output unit that is not shown, to insert a mobile device 13, 14 into the charging station 17. Here the same input/output unit can be used, which may be used for a confirmation mentioned above.

According to one or more embodiments, which has independent significance, the motor vehicle door 3 is claimed as such, which has a motor vehicle lock 6 and a proposed control arrangement 1. In this respect, reference may be made to all the statements relating to the control arrangement 1.

In a particularly preferred design, the control arrangement 1 is set up to receive electrical power from the interior of the motor vehicle. Against this background, it is preferable that the above mentioned charging station 17 is formed by an internal trim 27 of the motor vehicle door 2.

According to one or more embodiments, which also has independent significance, the motor vehicle 3 with at least one of the above mentioned motor vehicle doors 2 is claimed as such. In this respect, too, reference may be made to all the statements relating to the motor vehicle door 2 and the proposed control arrangement 1.

In the case of the motor vehicle 3, an above charging station 17 may be arranged on one motor vehicle door 2 or on several motor vehicle doors 2. Alternatively or additionally, the charging station 17 may also be arranged elsewhere in the interior of the motor vehicle, in particular on a center console of the motor vehicle.

According to one or more embodiments, which also has independent significance, a method for the control of a proposed motor vehicle door 2 by means of a proposed control arrangement 1 is claimed as such.

According to the proposed method, in the emergency operating mode electrical power is received wirelessly from the mobile device of the first type 13 via the transmission unit 12, wherein 11 the opening drive 7 is controlled by means of the door control unit for opening the motor vehicle lock 6 using the received electrical power. In this respect, too, reference may be made to all the statements regarding the proposed motor vehicle door 2 and the proposed control arrangement 1.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A control arrangement for use with a motor vehicle door, including a lock and an opening drive configured for providing motorized opening of the lock, wherein the lock comprises a locking mechanism of a lock latch and a locking pawl and wherein for the motorized opening of the motor vehicle lock, the opening drive is coupled to the locking pawl, so that the locking pawl can be lifted in a motorized manner by means of the opening drive, wherein when the control arrangement is in an assembled state, the control arrangement is supplied with electrical power from a motor vehicle on-board network, wherein the control arrangement is set up to receive electrical power from an interior of the motor vehicle, the control arrangement comprising:

a door control unit configured to control the opening drive and change from a normal operating mode to an emergency operating mode in response to detecting an emergency; and a power transmission unit, configured to, responsive to the door control unit changing from the normal operating mode to the emergency operating mode, wirelessly receive electric power from a first mobile device in the interior of the motor vehicle and provide the received electric power to the opening drive to open the lock, wherein the opening drive opens the lock by lifting the locking pawl without a user applying an actuation force to an inner door handle or an outer door handle of the motor vehicle door via a mechanical force chain.

2. The control arrangement of claim 1, wherein the power transmission unit includes a wireless transmitting/receiving unit configured to wirelessly charge the first mobile device and/or a second mobile device, when the door control unit is in the normal operating mode.

3. The control arrangement of claim 2, wherein the power transmission unit includes a charging station configured to engage the first mobile device and/or the second mobile device so that the first mobile device and the second mobile device each transmit to the power transmission unit and/or receive power from the power transmission unit.

4. The control arrangement of claim 1, wherein the first mobile device is configured to wirelessly deliver electrical power and wirelessly receive electrical power.

5. The control arrangement of claim 2, wherein the second mobile device is configured to wirelessly receive electrical power.

6. The control arrangement of claim 1, wherein the door control unit is configured to, responsive to changing to the emergency operating mode, prompt a confirmation to an operator via an input/output unit and/or the first mobile device and only enable the power transmission unit to receive electrical power in response to receiving the confirmation.

7. The control arrangement of claim 1, further comprising:

an electric door actuating element, wherein when the door control unit is configured to responsive to the door control unit being in the emergency operating mode and actuation of the electric door actuating element, operate the opening drive.

8. The control arrangement of claim 1, wherein the power transmission unit is configured to establish a wireless communication path to the first mobile device and enable reception of the electrical power only after establishment of the communication path.

9. The control arrangement of claim 1, wherein the power transmission unit is configured to provide the electrical power to the door control unit and/or the opening drive without buffering in an energy buffer.

10. The control arrangement of claim 1, wherein the power transmission unit is configured to provide the electrical power to an energy buffer and to the door control unit and/or the opening drive from the energy buffer.

11. The control arrangement of claim 1, wherein the door control unit is further configured to detect the emergency in response to receiving a crash signal from a crash sensor and/or a voltage of the on-board network falling below a predetermined threshold.

12. The control arrangement of claim 3, further comprising:

an input/output unit wherein the door control unit is further configured to, responsive to operating in the emergency operating mode, command the input/output unit to output an invitation to an operator to insert a mobile device into the charging station.

13. A motor vehicle door comprising:

a lock comprising a locking mechanism of a lock latch and a locking pawl;

an opening drive coupled to the locking pawl, the opening drive configured to provide motorized opening of the lock so that the locking pawl can be lifted in a motorized manner by means of the opening drive;

a door control unit configured to control the opening drive and change from a normal operating mode to an emergency operating mode in response to detecting an emergency, the door control unit being set up to receive electrical power from an interior of the motor vehicle; and a power transmission unit, configured to, responsive to the door control unit changing from the normal operating mode to the emergency operating mode, wirelessly receive electric power from a first mobile device in the interior of the motor vehicle and provide the received electric power to the opening drive to open the lock, wherein the opening drive opens the lock by lifting the locking pawl without a user applying an actuation force to an inner door handle or an outer door handle of the motor vehicle door via a mechanical force chain.

14. The motor vehicle door of claim 13, further comprising:

an inner trim panel forming a charging station connected to the power transmission unit, wherein the charging station is configured to charge the first mobile device or a second mobile device, wherein the first mobile device and the second mobile device are each configured to be inserted into the charging station.

15. A method of controlling a motor vehicle door including a lock and an opening drive configured to provide motorized opening of the lock, wherein the lock comprises a locking mechanism of a lock latch and a locking pawl and the opening drive is coupled to the locking pawl so that the locking pawl can be lifted in a motorized manner by means of the opening drive, and a controller configured to receive power from a vehicle on-board network and to receive electrical power from an interior of the motor vehicle, the method comprising:

detecting, by the controller, an emergency situation;

changing the controller from a normal operating mode to an emergency operating mode in response to the detecting step;

providing electrical power wirelessly from a first mobile device in the interior of the motor vehicle to a power transmission unit;

providing the received electrical power to opening drive; and opening, by the opening drive, the lock by lifting the locking pawl without a user applying an actuation force to an inner door handle or an outer door handle of the motor vehicle door via a mechanical force chain.

16. The method of claim 15, further comprising:

providing, by an input/output device, a confirmation to an operator; and receiving the confirmation from the operator.

17. The method of claim 16, further comprising:

establishing a wireless communication path between the first mobile device and the power transmission unit.

18. The method of claim 17, further comprising:

executing, by the controller, an authentication query via the communication path.

19. The method of claim 15, wherein the detecting step includes a voltage of the on-board network falling below a predetermined threshold.

\* \* \* \* \*